United States Patent [19]

Berkes et al.

[11] 4,440,797

[45] Apr. 3, 1984

[54] METHOD FOR CONTINUOUS PRODUCTION OF CHOCOLATE MASS

[75] Inventors: Klaus Berkes, Dresden; Helmut Förster, Heidenau; Wolfgang Huth, Dresden; Günter Ritschel; Georg Schebiella, both of Heidenau; Norbert Scholz; Frank-Gerhard Thomas, both of Dresden, all of German Democratic Rep.

[73] Assignee: Veb Kombinat Nagema, Dresden, German Democratic Rep.

[21] Appl. No.: 259,107

[22] Filed: Apr. 30, 1981

Related U.S. Application Data

[63] Continuation-in-part of Ser. No. 221,191, Dec. 29, 1980.

[30] Foreign Application Priority Data

Dec. 29, 1979 [DD] German Democratic Rep. ... 218276

[51] Int. Cl.³ .......................... A23G 1/00; A23G 1/14
[52] U.S. Cl. .................................... 426/613; 426/631; 426/476; 426/486; 426/487; 426/660; 426/662
[58] Field of Search .............. 426/613, 631, 312, 319, 426/475, 486, 487, 520, 476, 660, 662

[56] References Cited

U.S. PATENT DOCUMENTS

| | | | |
|---|---|---|---|
| 2,356,181 | 8/1944 | Rubens | 426/613 |
| 2,441,861 | 5/1948 | Widen | 426/319 |
| 2,645,580 | 7/1953 | Schultz | 426/319 |
| 3,628,965 | 12/1971 | Nijkerk | 426/486 |
| 3,904,777 | 9/1975 | Goerling | 426/631 |
| 4,156,743 | 5/1979 | Schmitt | 426/631 |

*Primary Examiner*—Jeanette M. Hunter
*Attorney, Agent, or Firm*—Michael J. Striker

[57] ABSTRACT

A method of continuous production of refined chocolate mass from a non-refined cocoa mass composed of a mixture of components reduced in size to a fineness required for the final mass but still containing undesired aromatic substances and moisture and being processed into a low fat, friable or pulverized chocolate mass, is mixed in a plasticator with a preheated air stream which is admitted in the same feeding direction, simultaneously externally heated for a time interval between 5 and 8 minutes while being intensively mixed by shearing stresses until the mass becomes plasticized; thereupon the fluidity of the mass is increased by an emulsifier, then the entrained gas is separated from the mass, the latter is weighed and supplemented according to a final recipe by additional fat content, and the final mass is collected in a container and subjected to an additional homogenizing treatment and in a cooled condition is forwarded for the final processing.

13 Claims, 7 Drawing Figures

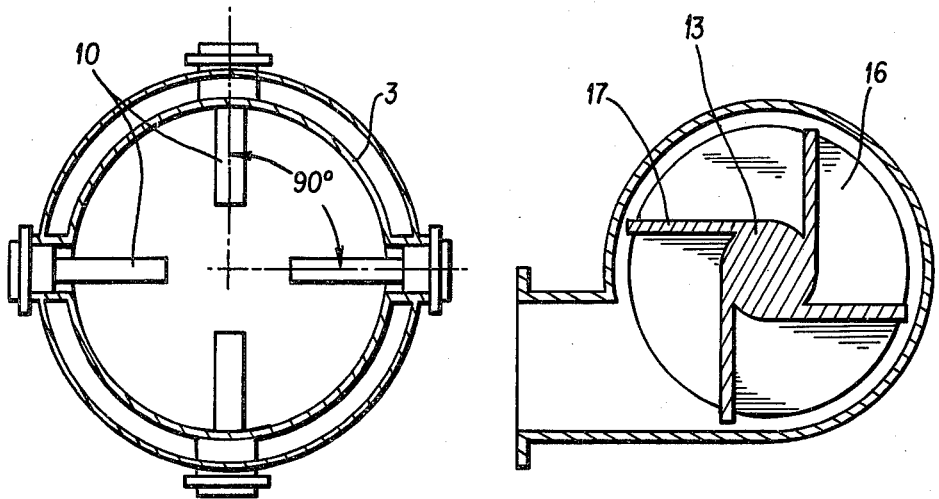
FIG. 3
FIG. 6
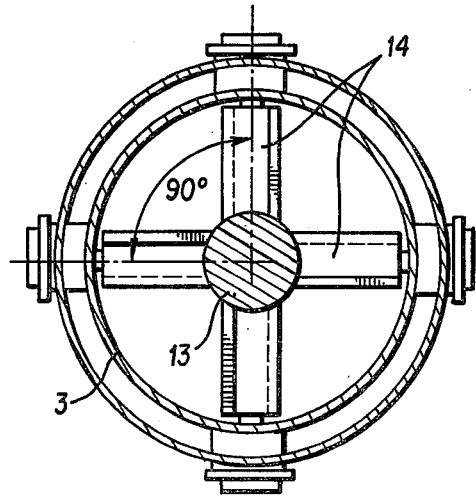
FIG. 4
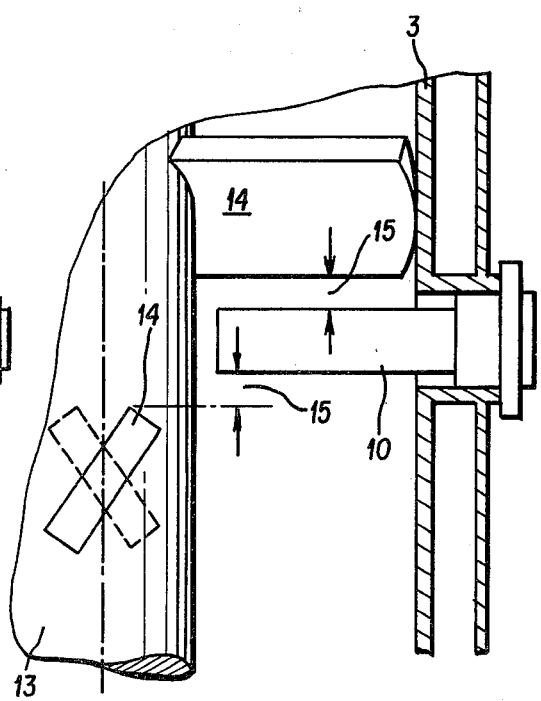
FIG. 5

METHOD FOR CONTINUOUS PRODUCTION OF CHOCOLATE MASS

CROSS-REFERENCE TO RELATED APPLICATION

This application is a continuation-in-part application of our copending application Ser. No. 221,191, filed Dec. 29, 1980 and entitled METHOD OF AND A DEVICE FOR CONTINUOUS PRODUCTION OF CHOCOLATE MASS.

BACKGROUND OF THE INVENTION

The invention relates in general to the production of chocolate, and in particular to a method of and a device for the continuous production of a chocolate mass from a non-refined cocoa mass which still contains undesired aromatic substance and moisture, finally ground and mixed to a degree required by the final prescription and also contains all usual constituents except fat, water and emulsifier.

These constituents, as known, are sugar only when producing dark chocolate, or sugar, milk powder and cocoa butter in the case of milk chocolate mass.

In producing chocolate masses it is conventional to grind and mix raw stocks and, in order to create the desired aromatic and tasty quality as well a favorable processing quality of the pretreated mass, the latter is subjected to a simultaneous mechanical and heat treatment. This refining process, which is called a tumbling treatment in a conche represents with respect to the quality of the final product the essential part in the technological process in the manufacture of chocolate mass.

In order to make this refining process of the chocolate mass more effective, numerous tumbling methods and kinds of conches have been devised relating either to individual processing stages or to the entire manufacturing process.

As is generally known, prior-art tumbling treatment in a conch which is based on discontinuous processing is very time-consuming and requires considerable energy input, to intensify tumbling treatment in existing conches by means of improved machinery, definite limits have been encountered for such improvement.

Analyses of technological processes have resulted in modern solutions of the tumbling processes in conches. It is known for example that by using a dry tumbling treatment in conventional, discontinuously operating conches, the overall period of the entire process is shortened; nonetheless, the high consumption of energy remains unchanged. Also, various processes have been devised combining the grinding, the mixing and the tumbling treatment in conches. For example, a method and a device is known in which the mixing and grinding of the chocolate components takes place in a recirculating process whereby the chocolate in each repeated circle runs through consecutively arranged mixing and grinding devices, and during the recirculation is sprayed in the form of a film or band which encounters one or more separate streams which are taken up by the chocolate mass. This stream or streams can be of gas, for example an air stream. In this manner solid particles can be gradually optimized until a fluid phase of the chocolate mass is attained; in this fluid phase the chocolate mass is again grated in a grinding device whereby upon each passage a renewed mixing and introduction of one or more separate gas streams takes place. The device required for carrying out this circulation process occupies a small space. Nonetheless, this method brings about no substantial time and energy savings; neither does it facilitate a continuous discharge of the chocolate mass. This known method is suitable for the manufacture of chocolate masses having a high fat content (German published patent application No. 1 902 778).

Furthermore, methods and devices have been developed in which the process of refining the chocolate mass has been intensified by separating in time and place the individual-process stages such as the removal of moisture and undesired substances from the processing stages concerning the plastification and homogenization. The refining process of the chocolate mass is hereby carried out either continuous or discontinuously. In doing so, the cocoa mass before its mixing with other usual components is subjected to a preliminary treatment to drive out moisture and undesired substances. These impairing substances and moisture are removed from the cocoa mass in such a manner that the mass is kept in a fluid condition and continuously advanced while additional water is continuously added, and this additional water is emulsified with the mass during its advance whereupon the mass is spread into a thinner layer and the layer is degasified by ventilation or under the effect of vacuum (German published patent application No. 2 313 563; DE-WP No. 98 817). In another known continuous process the chocolate mass prepared from the pretreated cocoa mass is rolled, liquefied and finally homogenized in a homogenizer by the effect of shearing forces and simultaneously a direct current of air and nitrogen is guided through the chocolate mass. The disadvantage of this known method is the fact the the intended exchange of substances between the gas stream and the chocolate mass in fluid condition takes place only partially (German published patent application No. 2 238 519).

Known also are a method of and a device for manufacturing milk chocolate masses, in which the cocoa mass is alternately mixed with added charges of cocoa butter and milk powder. The discharge in corresponding two mixing containers is effected so that a continuous stream of cocoa mass is created which is subsequently subject to spreading into a thin layer for the purpose of dehydration. Subsequently, cocoa butter, lecithin and sugar are added to the demoistured cocoa mass and the resulting mixture undergoes alternately a charge homogenizing process. The discharge of the finished mass occurs batchwise, whereby the individual batches or charges are unified into a continuous stream. The device employed for carrying out this method includes substantially as main processing stations a charge mixer, a refining unit in which the mass is spread into a thin layer, a continuous kneading machine, a milling device and additional mixers. It is evident that in practice this known method requires a complex machinery with corresponding high technological expenditures, whereby it does not ensure any completely continuous treatment (DD-publication No. 123 570).

Furthermore, a continuous process for manufacturing chocolate masses is known which differs from the foregoing method in preparation by means of a preliminarily refined cocoa mass of a low fat basic mixture which is rolled in a known manner. The resulting basic mixture in the form of a dry, friable rolled product is intensively treated by means of activation of limit surfaces without any additional dehydration. Thereupon, dehydrated cocoa mass, cocoa butter and lecithin are added. The resulting chocolate mass which now corresponds to the final recipe is again exposed to an intensive shearing load and liquefied. In order to process the rolled semi-product, there are provided containers for plasticization and an additional container for homogenization of the chocolate mass, whereby each container is equipped with a cross beam mixing mechanism cooperating with intermeshing fingers mounted on the inner walls of the container (DDR publication No. 108 451).

Even by means of this method, which also requires the application of a pretreated, dehydrated cocoa mass, the aforementioned disadvantages pertaining to the previously discussed methods of this kind, namely a high expenditure on machinery and high production costs, are not avoided.

SUMMARY OF THE INVENTION

It is therefore a general object of the present invention to overcome the aforementioned disadvantages.

More particularly, it is an object of the invention to provide an improved manufacturing process for the chocolate mass in which a preliminary treatment of the cocoa mass can be dispensed with.

Another object of the invention is to provide such an improved manufacturing process in which the tumbling treatment in a conche is effected in a shorter time period and with a lesser energy consumption than in conventional processes.

An additional object of the invention is to provide a method of manufacturing milk chocolate masses as well as dark chocolate masses which enables, apart from the elimination of the step of a preliminary treatment of the cocoa mass, a continuous refinement in the sense of dehydration and removal of undesired aromatic substances, of a mixture of chocolate mass ground to a degree required for the final product.

A further object of the invention is to provide such an improved manufacturing method which results in a homogenized chocolate mass of the best quality, whereby the processing time and energy consumption are considerably reduced.

Still another object of this invention is to provide a device for carrying out the above method which occupies a reduced space and requires lower installation costs.

In keeping with these objects, and others which will become apparant hereafter, the method of this invention resides in the steps of preparing a non-refined cocoa mass composed of a mixture of cocoa particles ground to a degree desired for the final recipe but still containing undesired aromatic substances and moisture; producing from the non-refined cocoa mass a low fat, friable or pulverized, non-refined chocolate mass; moving the non-refined chocolate mass in a feeding direction while internally mixing the mass with a heated gas stream admitted in the same feeding direction and simultaneously exposing the treated mass to external heat for a time interval between 5 and 8 minutes while subjecting the heat-treated mass to an extensive mechanical mixing and shearing stresses until the mass becomes plasticized; increasing fluidity of the plasticized mass by adding an emulsifier; separating entrained gas from the plasticized mass; conveying the degassed mass and adding doses of additional fat substances required for the final recipe; repeating the intensive mechanical mixing and shearing treatment for 4 to 6 minutes until the mass becomes homogenized; and cooling the mass to a discharging temperature. The discharging temperature is between 313° K. and 333° K. In a further elaboration of this process, the low fat, friable or pulverized chocolate mass, before the refining treatment thereof is supplemental so as to have a final fat content between 27% and 29% in the case of milk chocolate masses and between 23% and 27% in the case of dark chocolate masses, whereby the content of lecithin for both kinds of chocolate masses is up to 0.1%. Furthermore, in order to develop aroma and fine structure of the chocolate mass, the temperature of the chocolate mass during the step of plasticization is set to be between 338° K. and 348° K. in the case of milk chocolate masses and between 358° K. and 368° K. in the case of dark chocolate masses. Additional features of the method of this invention include the preheating of the gas stream particularly an air stream, to a temperature between 313° K. to 328° K. in the case of milk chocolate masses, and between 343° K. and 358° K. in the case of dark chocolate masses, whereby the amount of air in the gas stream is adjusted to be between 0.1 and 0.3 cubic meters per kilogram of chocolate mass. As an emulsifier, there is employed raw lecithin that is introduced into the plasticized chocolate mass in such an amount that, in the case of milk chocolate masses, it forms at least 0.2% and, in the case of dark chocolate masses, at least 0.15% of the total percentage, whereby these proportions represent simultaneously the total percentage of lecithin in the final recipe for the chocolate.

According to the invention, plasticization takes place in a shearing rate gradient between 300 $s^{-1}$ and 1500 $s^{-1}$, and the homogenization takes place in a shearing rate gradient between 200 $s^{-1}$ and 1000 $s^{-1}$, whereby the magnitude of the individual shearing gaps is uniformly between 8 and 15 mm.

The plant for carrying out the method of this invention is characterized by the following main features: plasticator station is formed of two parallel-connected cylindrical double-walled plastification containers each being equipped with vertically arranged cross blade mixing mechanism cooperating with intermeshing stationary fingers, and each being equipped with a discharging device; a charging container is connected to one input of each tumbling container to discharge therein the dry, friable pulverized chocolate mass, and an intermediate container is connected to respective outlets of the tumbling or mixing containers and is designed for separating gases from the chocolate mass. The outlet from the intermediate container is connected to a weighing and dosing device including a weighing container with assigned dosing hoppers for complementing the chocolate mass with all ingredients required for the final composition; the weighing and dosing device is connected to a collecting container from which the final chocolate mass is fed into a homogenizer which corresponds in design to the tumbling or mixing container. Another feature of this invention is the fact that each tumbling or mixing container has an additional inlet port arranged at the level of the inlet port for the chocolate mass and serving for introducing the preheated gas stream into its interior. A third inlet port in each tumbling or mixing container is arranged approximately at the level of the outlet port for admitting an emulsifying agent. According to still another feature of this invention, the intermeshing fingers in each tumbling or mixing container are in the form of shearing rods mounted in the wall of the tumbling container in pairs opposite each other and being uniformly spaced apart in axial direction and radially staggered about 90° one from each other. The shearing rods both in the tumbling container or and in the homogenizer are exchangeably mounted in the inner wall of the respective containers; the mixing or agitating mechanism is in the form of an axially directed rotary shaft having shearing arms intermeshing with the stationary shearing rods and being likewise arranged in pairs opposite each other, axially spaced apart in equal distances and radially staggered relative to each other about 90°. It is also within the scope of this invention that the shearing arms have a rectangular cross section and are pitched about an angle of 30° to 45° relative to the axis of the agitating shaft; the shearing arms are rigidly connected to the central shaft and, as mentioned above, intermesh with the stationary shearing rods, whereby due to their inclination exert an upward thrust on the viscous liquid. It is also one feature of this invention that the discharging device is mounted at the level of the outlet ports of each tumbling container on the agitating shaft and is in the form of a centrifugal sling disk formed with a plurality of vanes directed tangentially to the circumference of the shaft.

A particular advantage of this invention lies in the fact that, due to the novel method and device, the chocolate mass can be manufactured in a continuous process without the necessity to make a preliminary refinement of the starting cocoa mass, namely without the necessity to remove moisture and impairing substances from the cocoa mass and, in spite of this simplified process, a final product will result which has no difference in quality in comparison with chocolates manufactured by conventional methods. In addition, the subsequent processing of the final chocolate mass, due to its improved rheological properties when manufactured according to this invention, is also more advantageous.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 3 is a radial section through the plasticator according to FIG. 2 taken along the line VIII—VIII and illustrating the built-in shearing rods;

FIG. 4 is a radial section through the plasticator according to FIG. 2 taken along the line C—C and illustrating mixing arms of a central agitating shaft;

FIG. 5 is a perspective view on an enlarged scale of a cut-away portion of an intermeshing shearing rod with the pitched shearing arm;

FIG. 6 is a radial section through the plasticator according to FIG. 2 taken along the line B—B and illustrating the discharging device.

DESCRIPTION OF THE PREFERRED EMBODIMENTS

Figure 1:
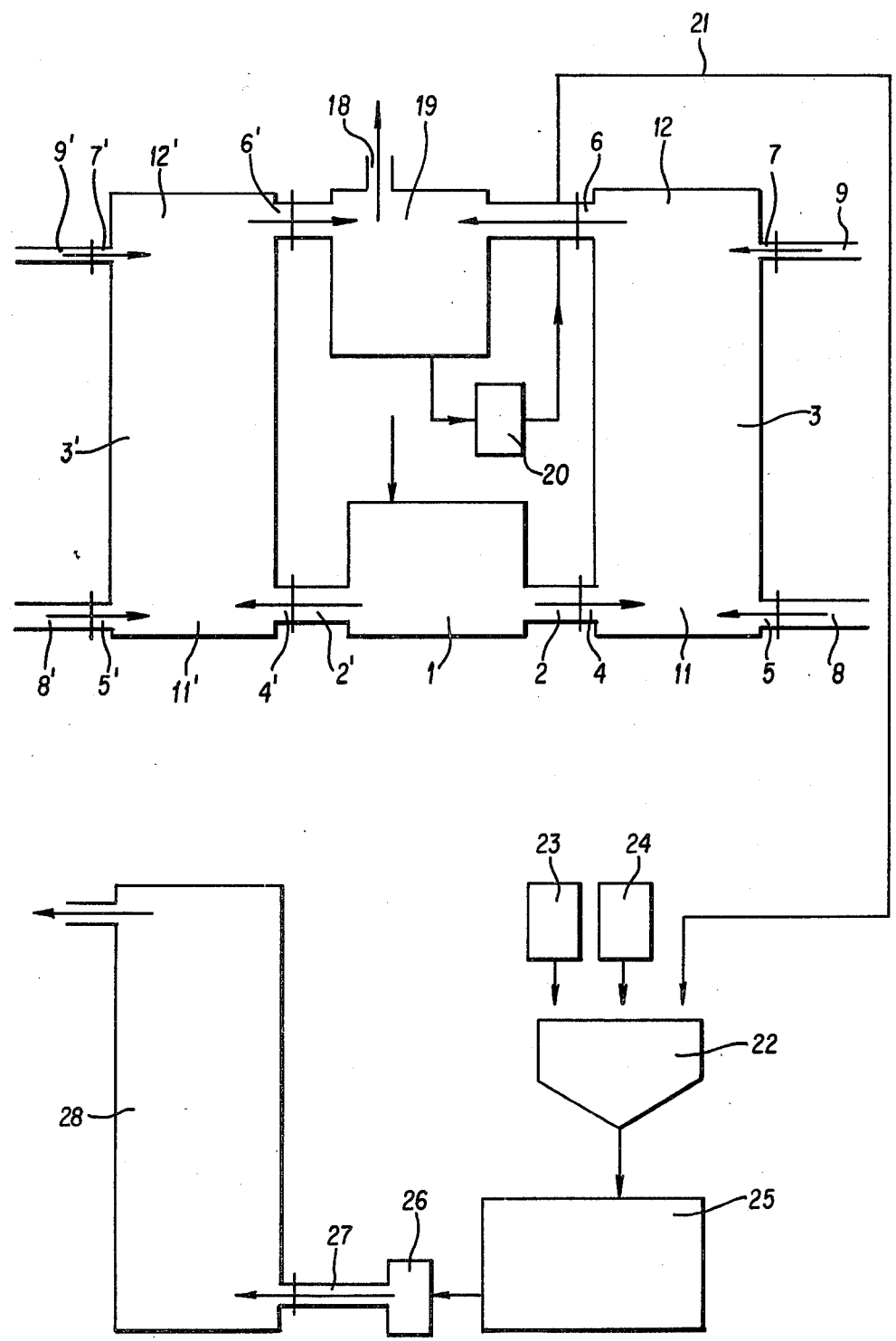
FIG. 1 is a schematic layout of a device for continuous production of chocolate mass according to this invention.

Referring firstly to FIG. 1, a low fat, friable pulverized non-refined chocolate mass, prepared from a non-refined cocoa mass composed of a mixture of cocoa particles ground and kneaded to a degree required for the final product and also including all admixtures required for the final product except the final content of fat, water and emulsifier, is fed from a charging container 1 via screw conveyors 2 and 2' or other suitable conveying devices into a pair of parallel-connected and vertically arranged cylindrical plasticators 3 and 3'. Each plasticator has double walls connected to a non-illustrated source of circulating hot water and cold water connected for regulating in a conventional manner the process temperature in each container. At the bottom part of each respective plasticators there is arranged a mass inlet port 4 or 4' and a gas inlet port 5 or 5' and at the top part there is arranged a mass outlet port 6 or 6' and immediately below, another inlet port 9 or 9' for an emulsifying agent. Each gas inlet port 5 and 5' is connected in a conventional manner to a feeding conduit 8 and 8' for feeding in an amount of air required for processing the incoming chocolate mass from the container 1; similarly, feeding conduits 9 and 9' are connected to inlet openings 7 and 7' to feed into each container a corresponding amount of an emulsifier such as an amount of lecithin.

Figure 2:
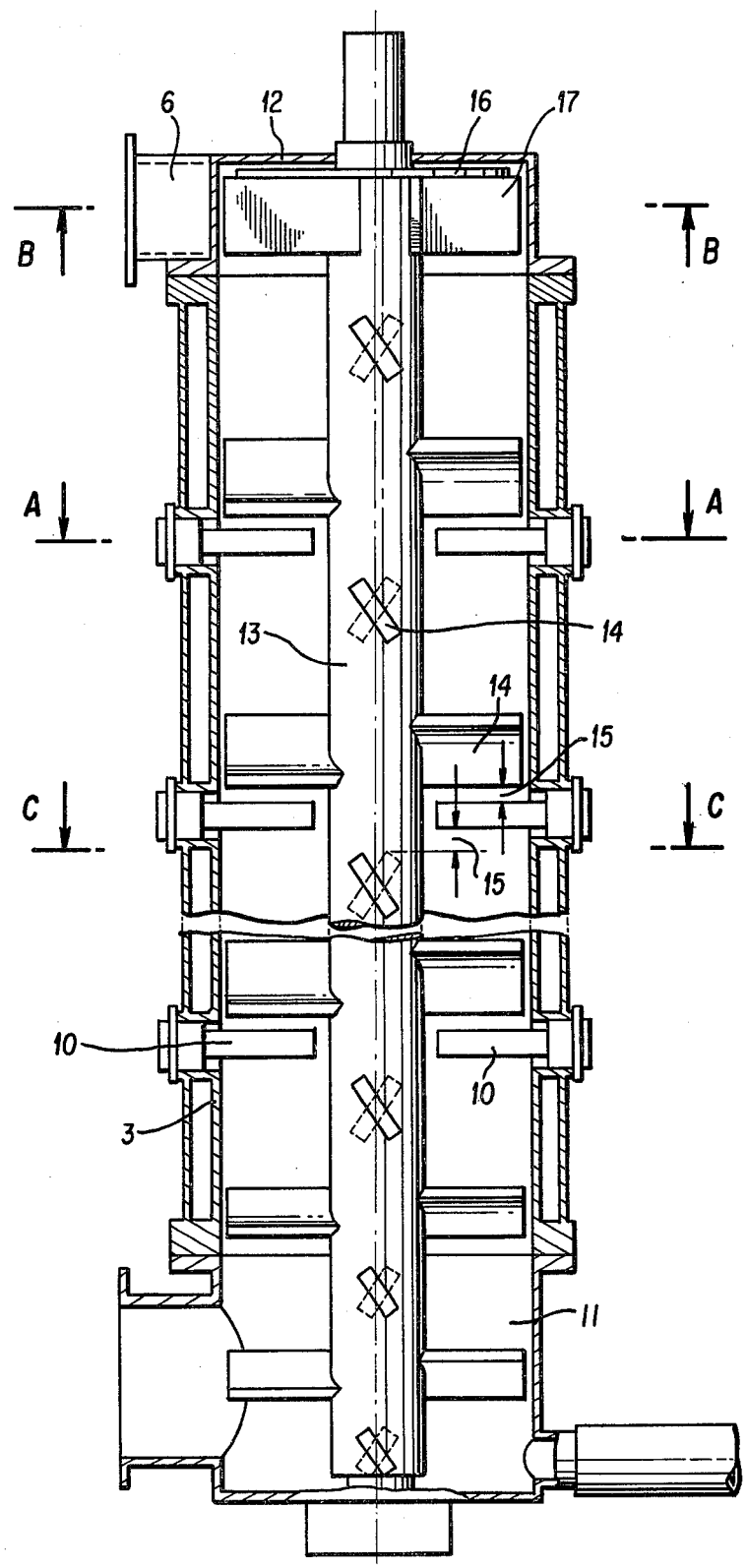
FIG. 2 is an axial section through a tumbling plasticator including a built-in mixing mechanism and a discharging device.

The construction of each plasticator (or conche) 3 and 3' as well as of a homogenizer 28, as will be explained below, is illustrated in FIG. 2. The inner wall of each plasticator is provided with built-in fingers in the form of shearing rods 10 having, preferably, a rectangular cross section. As depicted in FIG. 3, the shearing rods 10 are arranged in juxtaposed pairs and are radially staggered relative to each other about 90° and are spaced apart from each other in vertical direction and are exchangeably mounted in corresponding sockets in the double walls of the container. The shearing rods 10 intermesh with shearing blades or arms 14 fixedly mounted on a central rotary shaft 13. The shearing arms 14, as seen from FIG. 4, are also arranged crosswise in opposite pairs and are angularly spaced from each other about 90° and, as illustrated in FIG. 5, the arms are pitched relative to the center axis of the rotary shaft 13 about an angle of about 35° to exert an upwards thrust on the processed viscous liquid of the chocolate mass. The tips of the shearing arms extend in horizontal direction in close proximity to the inner walls of plasticator 3 and, as seen most clearly from FIG. 5, the stationary shearing rods 10 are arranged approximately midway between the staggered and superimposed pairs of these arms 14 and extend also in close proximity to the periphery of the shaft 13. The clearance 15 between the shearing arms 14 and the shearing rods 10 is between 8 and 15 mm. The optimum plastification of the treated chocolate mass is achieved in the range of shearing gradients of 300 $s^{-1}$ to 1500 $s^{-1}$. The discharging device for the plasticized chocolate mass is mounted on the top of the agitating shaft 13 at the level of the mass discharge port 6 (FIG. 2). As illustrated in greater detail in FIG. 6, the discharging device is constituted by a centrifugal sling disk 16 formed on its lower surface with a set of sling vanes 17 extending tangentially to the circumference of the rotary shaft 13, so as to continuously displace the plastified chocolate mass through the outlet port 6.

Referring again to FIG. 1, the discharged chocolate mass is fed into an intermediate container 19 in which the admixed air is separated from the chocolate mass and discharged through an exhaust port 18, the degassed chocolate mass in a paste-like condition is fed by means of a pump 20 through a feeding conduit 21 into a weighing and dosing device including a weighing hopper 22 equipped with a non-illustrated agitator and cooperating with dosing hoppers 23 and 24 by means of which weighed doses of cocoa butter and additional fats are added to a weighed amount of chocolate mass in the weighing hopper 22 to complete the same to the prescribed final composition. This final chocolate mass, which is now in a fluid condition, is discharged from the weighing hopper into a collecting container 25 and therefrom is forwarded by means of a delivery pump 26 and a conduit 27 into a homogenizer 28. As mentioned before, the homogenizer 28 has the same structure as the plasticator 3 and 3′, namely the same intermeshing stationary mixing rods, a rotary mixing mechanism, as well as a centrifugal discharging device. In the homogenizer, the chocolate mass is once more subjected to a high shearing load in the range of shearing gradients of $200 \, s^{-1}$ to $1000 \, s^{-1}$ and subsequently is cooled down to a discharging temperature at which it is delivered to further processing during which the mass is brought into its final condition. Upon the discharge from the homogenizer for example, the chocolate mass can be immediately fed onto a subsequent processing line such as for instance a pelleting station.

Figure 7:
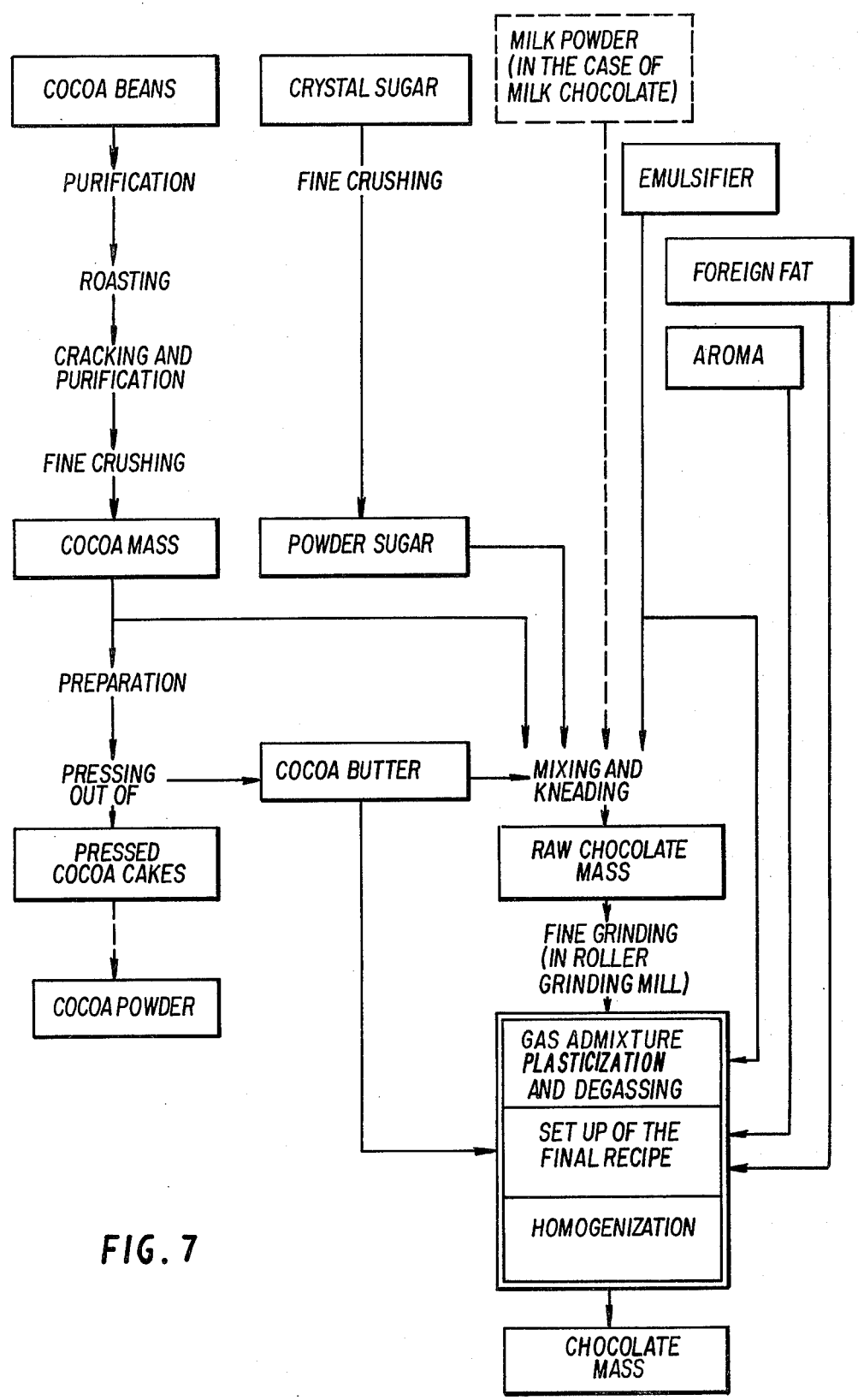
FIG. 7 is a flow diagram of the entire method for producing chocolate mass according to this invention.

An example of a continuous manufacture of a dark chocolate mass having final fat content of 31% and an output of 1000 kg of chocolate mass per hour and produced by the method of this invention, will now be described with reference to FIG. 7. The flow chart explains the entire manufacturing process whereby the processing stages pertaining to the invention are indicated by double lines.

In accordance with a predetermined recipe, the components of the chocolate mass, such as non-treated cocoa mass, powdered sugar, and 0.05% lecithin, are at first mixed together and kneaded in a continuous kneader. Upon the crushing of respective components to their final size by means of a rolling mill, the non-refined chocolate mass is fed into the charging container 1. In this stage, the chocolate mass has a low fat, friable to pulverized condition and has a fat content of 23% to 25% and is at a temperature of about 318° K. From the charging container, the starting chocolate mass is conveyed by means of feeding screw conveyors to the pair of parallel-connected plasticator 3. In order to dehydrate the chocolate mass in each plasticator and to drive out undesired aromatic substances and also to achieve optimum aroma of the final product, an air stream preheated to about 353° K is introduced into the lower part of the plasticator 3 and in its interior is admixed with the incoming stream of chocolate mass from the charging container 1. The amount of supplied air is between 0.1 and 0.3 cubic meters per kilogram of chocolate mass. In each plasticator 3, the chocolate mass with the admixed air is subjected for a period of 5 to 8 minutes to a mechanical shearing load until the chocolate mass is plasticized and brought to a processing temperature of 368° K. The separation of the admixed air from the chocolate mass takes place in the subsequent intermediate container 19. In order to convert the plasticized chocolate mass into a more fluid, paste-like condition susceptible to being forwarded by means of a pump, 0.35% raw lecithin is fed through a separate inlet port at the upper part of the plasticator or tumbling container, and this amount of emulsifying agent corresponds to the entire content of lecithin in the final recipe. Thereupon the chocolate mass is evaluated as to its weight and completed to the final recipe by adding the required balancing amounts of fat in the weighing and dosing device whereby the balancing cocoa butter and other fat substances are also evaluated according to their weight. The resulting chocolate mass, corresponding to the final recipe and being now in a liquid condition, passes through the collecting container and is fed into a homogenizer where it is again exposed to a shearing load for a period of dwell between 4 and 6 minutes until it becomes homogenized and is then cooled to a discharging temperature of 313° K. to 333° K. The cooled chocolate mass manufactured in accordance with the method of this invention can, after its homogenization, be immediately forwarded to the subsequent stations for the final processing.

It will be understood that each of the elements described above, or two or more together, may also find a useful application in other types of constructions differing from the types described above.

While the invention has been illustrated and described as embodied in a method of and a device for use in manufacturing dark or milk chocolate masses, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A method for the continuous production of a refined chocolate mass, comprising the stepssof preparing a non-refined cocoa mass composed of a mixture of conventional components such as a mixture of cocoa mass with sugar or cocoa mass mixed with sugar, milk powder and cocoa butter; then producing from the non-refined cocoa mass a non-refined chocolate mass by reducing in size the components of the cocoa mass to a fineness required for the refined chocolate mass but still containing undesired aromatic substances, the non-refined chocolate mass being low in fat (in comparison to the refined chocolate mass) and having a friable or pulverized structure; then moving the non-refined chocolate mass in a feeding direction while internally mixing the same with a preheated gas stream flowing in the same feeding direction to remove moisture and undesired volatile components therefrom and to assist in advancing the mass in the feeding direction; simultaneously conching the mass by subjecting it to intensive mechanical mixing and shearing stresses until the mass is plasticized; separating gas from the plasticized mass; increasing liquidity of the mass by adding an emulsifier; thereafter adding to the liquefied mass doses of fat substances to adjust the fat content of the mass to that required in the refined chocolate mass; then homogenizing the completed mass by repeating the intensive conching or mechanical mixing and shearing treatment without the use of a gas stream while cooling the homogenized mass to a lower temperature and discharging the resulting refined chocolate mass for final processing.

2. A method as defined in claim 1, wherein the homogenized mass is cooled to a temperature between 313° K. and 333° K.

3. A method as defined in claim 1, wherein said emulsifier constitutes 0.1% of lecithin.

4. A method as defined in claim 3, wherein the low fat, friable or pulverized chocolate mass for a milk chocolate includes between 27% and 29% of fat prior to its refining.

5. A method as defined in claim 3, wherein said low fat, friable or pulverized chocolate mass for dark chocolate udes between 23% and 27% of fat prior to its refining.

6. A method as defined in claim 1, wherein the temperature of the chocolate mass during its plastification is increased to a range between 338° K. and 348° K. to develop aroma and fine structure of the final mass for milk chocolate.

7. A method as defined in claim 1, wherein the temperature of chocolate mass during its plastification is increased to the range between 358° K. and 368° K. in order to develop aroma and fine structure of the final chocolate mass for dark chocolate.

8. A method as defined in claim 3, wherein the admitted gas is air amounting to from 0.1 to 0.3 cubic meters per kilogram of chocolate mass.

9. A method as defined in claim 8, wherein for the production of milk chocolate mass the gas stream is preheated to the range between 313° K. and 328° K.

10. A method as defined in claim 8, wherein for the production of dark chocolate masses said air stream is preheated to a temperature between 343° K. and 358° K.

11. A method as defined in claim 1, wherein said emulsifier is raw lecithin added to the plastified chocolate mass in an amount corresponding to 0.2% of the refined output clocolate mass in the case of milk chocolate and to 0.15% of the output refined chocolate mass in the case of dark chocolate.

12. A method as defined in claim 1, wherein the plastification of the non-refined chocolate mass takes place in the range of shearing gradients between 300 $s^{-1}$ and 1500 $s^{-1}$ and the homogenization in the range of shearing gradients between 200 $s^{-1}$ and 1000 $s^{-1}$.

13. A method as defined in claim 12, wherein the stepts of plastification and homogenization take place in layers having a thickness between 8 and 15 mm.

* * * * *